Sept. 23, 1941.  A. AMES, JR., ET AL  2,256,587
CORRECTING OCULAR DEFECTS
Filed June 10, 1937  2 Sheets-Sheet 1
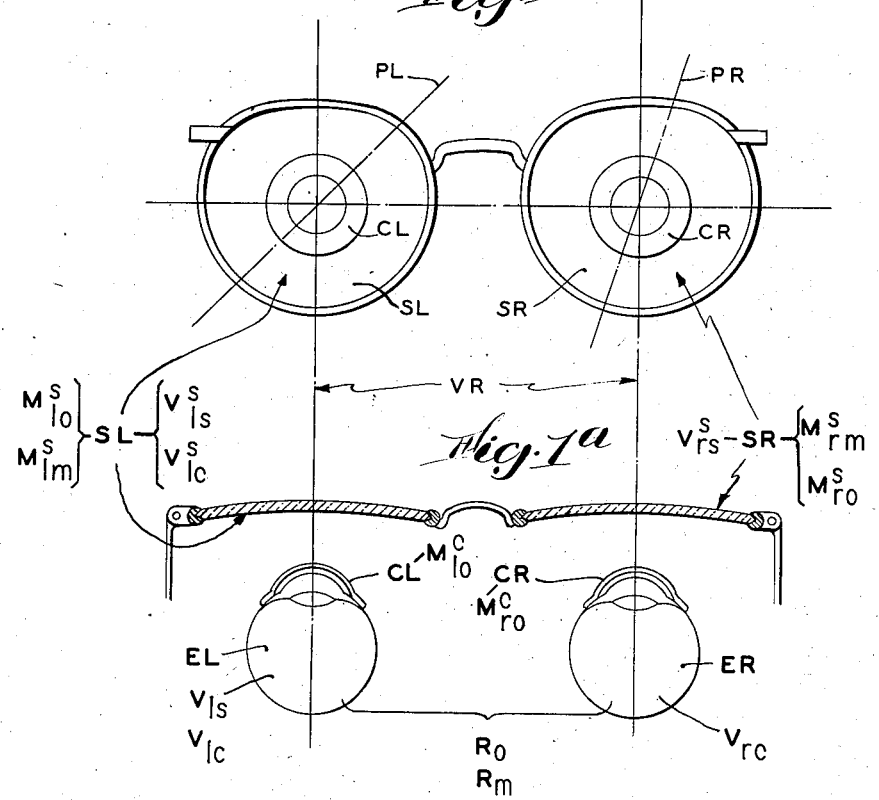
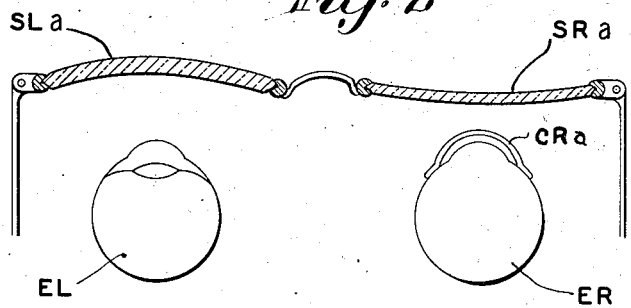

Patented Sept. 23, 1941

2,256,587

UNITED STATES PATENT OFFICE 2,256,587

CORRECTING OCULAR DEFECTS

Adelbert Ames, Jr., and Kenneth N. Ogle, Hanover, N. H., assignors to Trustees of Dartmouth College, Hanover, N. H., a corporation of New Hampshire Application June 10, 1937, Serial No. 147,442

4 Claims. (Cl. 88—54.5)

The present invention deals with the correction of defects of vision including aniseikonia. While Patent No. 1,933,578 of July 11, 1933, and several copending applications for Letters Patent, as for example Serial No. 748,788, filed October 18, 1934, and No. 67,557, filed March 6, 1936, disclose various modes of correcting practically all actually occurring defects of this type, there are certain instances where properly correcting spectacles are either inconvenient, somewhat unsightly, or offering difficulties in manufacture. Also, there are certain ocular defects occurring in connection with aniseikonia, as keratoconus, which can not be compensated with spectacles. In another instance, that of aphakia, it is often very difficult and sometimes practically impossible to provide satisfactory correction with spectacles alone.

It is one of the main objects of the present invention to avoid such difficulties, by utilizing for eikonic corrections so-called contact glasses, in themselves known for a long time, but heretofore only used for correcting dioptric defects.

In one aspect of the invention, use is made of the favorable magnification properties of glasses which are very close to the eye. In another aspect, the invention provides dioptric and eikonic correction by combining contact and spectacle glasses, thereby not only simplifying in many instances (as for example in the case of dioptric or eikonic defects of comparatively high degree, or in the presence of astigmatic and meridional eikonic defects) the manufacture of the required glasses, but also providing correction improved from the medical as well as aesthetical viewpoints.

Figure 3:
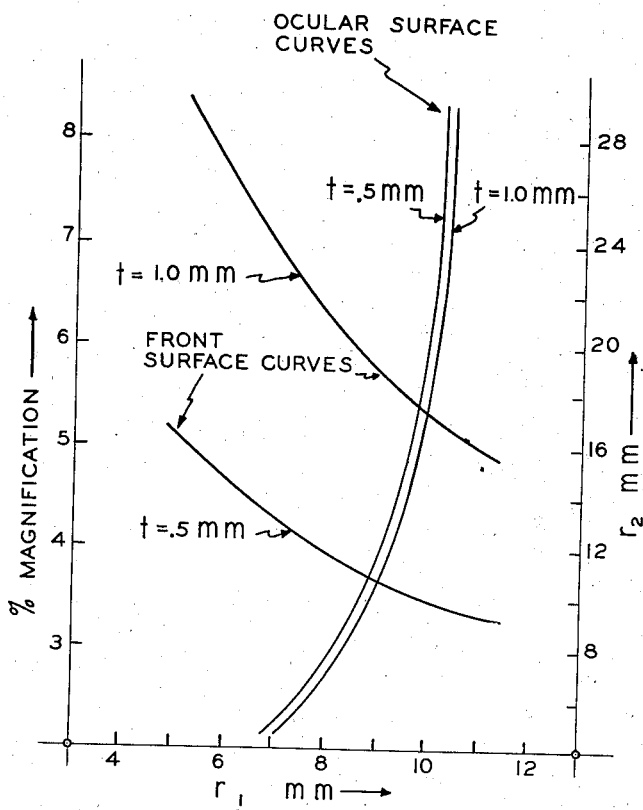
Figure 4:
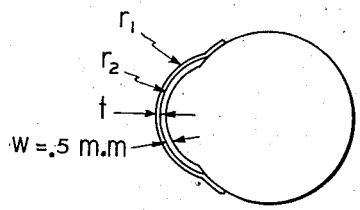

Further aspects and advantages will be apparent from the following description illustrating the genus of the invention with reference to several concrete embodiments thereof. The description refers to the drawings in which:

Figs. 1, 1ª and 2 are schematical showings of a correction combined of contact glasses and spectacles, according to the invention; and Figs. 3 and 4 are diagrams indicating certain properties of contact glasses according to the invention.

Shortly recapitulating the above-referred to disclosures, it will be remembered that aniseikonia is defined as an anomaly of the binocular visual apparatus in which a difference or incongruity exists between the sizes or shapes of the ocular images of the two eyes. The term "ocular image" describes the final impression received in the higher brain centers through the vision of an eye. The effective magnitude and shape of the ocular image are determined not only by the properties of the dioptric image as formed on the retina, but also by modifications imposed upon that image by the anatomical properties and physiological processes by which the optical image upon the retina becomes evident in the higher cortical centers. Hence, generally speaking, aniseikonic defects can be determined only by actual comparison of the ocular images, as for example disclosed in Patent No. Re. 19,841, of February 4, 1936. Such defects may be of different character, but for present purposes it will be sufficient to distinguish between "overall" and "meridional" aniseikonia, the former involving dimensional changes symmetric to a point, and the latter such changes symmetric to a line or meridian.

In most instances, dioptric defects must be corrected in addition to eikonic errors.

Herein, dioptric defects will be indicated in conventional manner in diopters, and eikonic defects in per cent magnification. The clinical tests for aniseikonia determine in given meridians the difference between the respective ocular images, which difference may be expressed as a ratio R, usually given as a per cent magnification 100 (R−1).

Again, in any meridian, an eikonic correction actually to be worn, herein also referred to as prescription, will be equivalent to the test correction if the magnifications in that meridian (the two respective eyes being indicated by subscripts $l$ and $r$) are related as follows:

$$\left[\frac{M_l}{M_r}\right]_p = R\left[\frac{M_l}{M_r}\right]_t \quad (1)$$

where $p$ and $t$ stand for the prescription (actually worn) and test corrections, respectively.

In order to correct the dioptric defects, the vergence powers, in any meridian, must be identical for prescription and test corrections, namely:

$$[V_l]_p = [V_l]_t$$
$$[V_r]_p = [V_r]_t \quad (2)$$

Since the reference planes of astigmatism (herein referred to as "principal meridians") and of meridional aniseikonia (herein referred to as "eikonic meridians") are, generally speaking, independent, and since the magnitudes of dioptric and eikonic defects, respectively, often call for quite dissimilar lens properties, the combined correction of dioptric and eikonic defects offers sometimes considerable difficulties which the present invention helps to overcome.

The elements of corrective eyeglasses, lens sets or combinations according to the present invention are spectacle glasses of the type described in the above-identified disclosures, and contact glasses of the type to be described herein, both elements modified for cooperation according to this invention.

A lens combination according to the present invention is diagrammatically shown in Fig. 1, and in this figure EL and ER are the left and right eye respectively, and it may be assumed, for example, that both eyes are ametropic and astigmatic in axes PL and PR, respectively, and that the presence was found of an overall aniseikonia as well as a meridional aniseikonia in eikonic meridian VR. It may be assumed that the left eye is lenticularly astigmatic, whereas the right eye has keratoconus.

The measured vergence power defects $V_{ls}$ (sphere, left eye), $V_{lc}$ (cylinder, left eye), $V_{rc}$ (cylinder, right eye) and the eikonic ratios $R_o$ (overall) and $R_m$ (meridional) indicated in Fig. 1 must now be reproduced in the correction to be worn by the patient, in accordance with the above relations 1 and 2. This is, for example, accomplished by providing EL with a contact glass CL having no powder, of a type to be described more in detail hereinafter, but providing an overall magnification $M^c{}_{lo}$, and with a spectacle lens SL providing spherical power $V^s{}_{ls}$ and cylindrical power $V^s{}_{lc}$ and, incidentally, certain overall and meridional magnifications $M^s{}_{lo}$ and $M^s{}_{lm}$, respectively. The right eye ER is provided with contact glass CR correcting the keratoconus and introducing an overall magnification $M^c{}_{ro}$, and with a spectacle lens SR providing spherical power $V^s{}_{rs}$ and meridional size correction $M^s{}_{rm}$ and, incidentally, an overall magnification $M^s{}_{ro}$.

The combined correction must be computed to fulfill the above conditions 1 and 2, and it will be observed that it permits a distribution of the component corrections which renders any one element of the component comparatively simple and avoids difficult curvature combinations, as for example such as required if compound astigmatic and meridionally eikonic effects are to be taken care of by a single lens element.

Some thought may, of course, be required in choosing the combination of optimum usefulness. The total effect of a system of this type, to be equivalent to the test correction, may be, for example, computed as described in "The Journal of the Optical Society of America," vol. 26, August, 1936, for the computation of power and magnification of a two lens system. In certain cases it will be preferable to determine the proper combination of contact and spectacle glasses empirically by first supplying the patient with contact lenses of optimum effect and then testing again for the spectacle correction which is to take care of the residual defect, as will be described more in detail hereinafter with reference to specific examples.

Another, especially important, embodiment of the present invention is the correction of aphakia, where the lens has been surgically removed from one eye, causing a considerable dioptric deficiency of that eye whereas the other eye may be unimpaired in this respect. The conventional correction of the aphakic eye by means of a spectacle introduces a large difference of the ocular images which often prevents binocular vision. This size difference can not very well be corrected with the aid of size elements mounted in spectacle frames because lenses correcting a high degree of aniseikonia can not be mounted rigidly enough to provide reasonably constant size correction, and because such lenses, in combination with the power lenses, are heavy, bulky and unsightly, causing the wearer so much discomfort as to make them practically useless.

In situations as this, a correction according to the present invention provides a solution. Referring now to Fig. 2, it may be assumed that the right eye ER is aphakic, whereas EL is normal. Assuming, for example, that the right eye needs a correction of $+10D$, a contact lens CRa is fitted to that eye, correcting it more or less approximately. It is, of course, desirable that the contact glass provide, if at all possible, the exact dioptric correction but, since the fitting of contact glasses depends on conditions which can not always be perfectly controlled, a compromise may have to be accepted in the form of a residual dioptric defect. The patient wearing the contact glass is then subjected to a test for the determination of the eikonic defect introduced by the dioptric contact correction. In the above instance, this test may, for example, indicate a 20% size difference, the ocular image of the left eye being to that amount smaller than the ocular image of the right eye. This aniseikonia is then corrected by means of a zero power magnifier SLa before the left eye, provided no residual power defect was found, or a magnifying lens before the left eye may be combined with a size reducing lens SRa before the right eye (as indicated in Fig. 2), providing the magnification ratio required to correct the measured aniseikonia. Correction for any residual dioptric defect can be incorporated in the spectacle lenses, as disclosed in the above-mentioned copending applications.

The above-discussed contact glasses are of the type providing a fluid lens between cornea and contact glass proper; the index of refraction of the saline solution forming the fluid lens being practically equal to that of the cornea, the surface between fluid lens and glass replaces, for optical purposes, the cornea surface, so that all kinds of spherical ametropia, as well as keratoconus and corneal astigmatism, can be corrected by contact glasses. Although this type of contact glass is the only one of practical importance at the present time, it is understood that the principle of the invention can be applied to other constructions, as for example glasses at least partly contacting the cornea.

In this connection, it will be understood that the fluid lens, for the above-mentioned reason of having for practical purposes the same index of refraction as the cornea, does not act as a lens in the conventional meaning of that word as indicating an optical element having two surfaces separating media of different indices of refraction. However, the data of the fluid lens, namely its thickness, the relative curvature of its surfaces (one of which is identical with the cornea and the other with the posterior surface of the contact glass) are nevertheless important characteristics of the entire optical system comprising eye, fluid lens, contact glass proper and, in many instances, a spectacle lens. For this reason, it is necessary to treat the fluid lens as a separate structure.

Heretofore, only the relative curvatures of the cornea and of a contact glass of uniform thickness have been practically utilized for correction purposes. Although it has also been proposed to use contact glasses effecting a certain dioptric power independently of the shape of the fluid lens (either bitoric contact glasses have been proposed, see Erggelet "Kurzes Handbuch der Ophthalmologie," vol. II, p. 676, et seq.), the thickness of the contact glass (together with its index of refraction) and of the fluid lens have not heretofore been dimensioned for the purpose of providing a predetermined corrective effect.

Especially important with respect to eikonic correction are contact glasses whose surfaces have not only a zero power effect in themselves, but do not change the dioptric condition of the eye for which they are designed.

It was found that those parallel surface contact glasses which are now being manufactured and which could be used with emmetropic eyes increase the image of the emmetropic eye by somewhat less than 4%. Computation shows that an increase of the depth of the salt solution chamber or fluid lens by 1 mm. increases the magnification about 5%, and that an increase of the thickness of the contact glass proper by 1 mm. increases the magnification about 4%.

The magnification effects of contact glasses of various shapes can be conveniently determined by means of charts, as for example similar to that shown in Fig. 3. This diagram presents two sets of curves for contact lenses which will not change the dioptric power of an eye for various glass thicknesses (0.5 and 1.0 mm. in Fig. 3); one set of curves (marked "Front surface curves") defines the relation between the radius of the front surface and the magnification, whereas the other set of curves (marked "Ocular surface curves") furnishes the corresponding curvatures of the ocular surfaces. It should be noted that these relations refer only to the magnification properties; contact glasses made in accordance therewith are suitable for correcting emmetropic eyes for eikonic defects. However, these relations are also a basis for determining magnification properties of contact glasses having in addition dioptric effects. The values correlated in Fig. 3 are shown in Fig. 4. If, for example, a contact glass effecting 4% magnification is desired, Fig. 3 indicates that, for $t=0.5$ mm., a radius $r_1$ of 7.8 mm. is necessary and a radius $r_2$ of 6.7 mm.

Fig. 3 is drawn for a fluid lens depth of $w=0.5$ mm.; analogous charts can be designed for other $w$ values.

The general principles of the invention having been explained, several embodiments thereof will now be described which will be helpful for a better understanding of the possibilities of its practical application.

In the following examples, the clinical record is first given in diopters and % magnification, respectively, and then the correction consisting either of contact glasses combined with spectacles, or only of contact glasses dimensioned according to the present invention. In most cases, it will be advisable first to make a complete dioptric and eikonic test according to the above indicated methods, then theoretically to select contact glasses best suited for the particular case, then again to examine the patient, with the contact glasses in place, and thereupon to determine the final prescription, either by retaining the contact glasses and computing spectacles accordingly, or, if necessary, by varying both contact glass and spectacle prescriptions until a combination of optimum usefulness is obtained.

*Examples*

(1) Clinical record (ametropia and aniseikonia):
(Right eye) +10.00 sph., −2.50 cyl. 90°
(Left eye) +1.50 sph., −1.00 cyl. 180°

The patient wearing on R. E. a contact glass effecting +9.00 D correction, and on L. E. a zero power contact glass effecting a 6% size correction, the following eikonic defect is found:

Second clinical record:
R. E.: 2% mer. 90°
L. E.: 8% overall
Correction:
R. E. contact: Standard correcting +9.00 D
  Spectacle: Standard iseikonic +1.00 sph., −2.50×90°+2% overall
L. E. contact: Zero power, 6%; dimensions $r_1=8.4$ mm., $r_2=8.1$ mm.
$t=0.75$ mm., $w=0.7$ mm.

Spectacle: Standard iseikonic +1.50 sph., −1.00×180°+2% 90°

(2) First clinical record (aphakia and astigmatism):
R. E. +9.00 sph., −2.00 cyl. 180°
L. E. +1.00 sph., −0.50 cyl. 90°

Second clinical record, patient wearing on R. E. a contact glass partially correcting the aphakia:

L. E. 12% overall, 1% mer. 180°
Correction:
R. E. contact: Standard correcting aphakia, as worn during second test
  Spectacle: Standard iseikonic −2.00 cyl. 180°, 1% mer. 180°
L. E. contact: Zero power, 8%; dimensions:

$r_1=8.5$ mm., $r_2=8.1$ mm.
$t=1.0$ mm., $w=1.0$ mm.

Spectacle: Standard iseikonic +1.00 sph., −0.5 cyl. 90°, 4% overall (3) First clinical record (ametropia and large aniseikonia):
R. E. +2.50 sph., −1.00 cyl. 180°; 6% overall, 2% mer. 180°
L. E. +1.00 sph., −0.5 cyl. 90°

Second test, patient wearing a contact glass correction 5% overall.

Correction:
R. E. contact: Zero power, 5%; dimensions:

$r_1=8.4$ mm., $r_2=8.1$ mm.
$t=0.8$ mm., $w=0.5$ mm.

R. E. and L. E.: Standard iseikonic prescription to correct ametropia and residual size difference as measured in second test.

(4) First clinical record (ametropia and aniseikonia):
R. E. +6.00 sph.
L. E. −5.00 sph.

Second clinical record, patient wearing standard contact glasses correcting the ametropia in each eye:

L. E. 3% overall, 1.5% mer. 180°
Correction:
Standard contact glasses as during second test:
R. E. spectacle: Standard iseikonic 1.5% mer. 90°
L. E. spectacle: Standard iseikonic 4.5% overall (5) Clinical record (high degree aniseikonia, no dioptric defect):
R. E. 8% overall, 3% mer. 90°
Correction:
R. E. contact: 6% overall; dimensions:

$r_1 = 8.5$ mm., $r_2 = 8.4$ mm.
$t = 1.0$ mm., $w = 0.7$ mm.

Spectacle: Zero power, dimensions:
Anterior surface: +11.49 D
Thickness: 3.65 mm.
Posterior surface: −11.73D
L. E. spectacle: Zero power, dimensions:
Anterior surface: −11.03D
Thickness: 2.50 mm.
Posterior surface: +11.18D (6) First clinical record (anisometropia):
R. E. +6.00 sph.
L. E. +2.00 sph.

Second test with standard +6.00 contact lens on R. E. indicates:

L. E. 4% overall
Correction:
R. E. contact standard +6.00D
L. E. contact 4% overall, dimensions:

$r_1 = 8.4$ mm., $r_2 = 8.2$ mm.
$t = 0.51$ mm., $w = 0.5$ mm.

(7) First clinical record (aphakia):
R. E. +9.00 sph.

Second test, patient wearing standard +9.00 contact glass:

L. E. 6% overall
Correction:
R. E. contact standard +9.00D
L. E. contact, zero power, 6% overall, dimensions:

$r_1 = 8.5$ mm., $r_2 = 8.0$ mm.
$t = 1.0$ mm., $w = 0.5$ mm.

It should be understood that the present disclosure is for the purpose of illustration only and that this invention includes all modifications and equivalents which fall within the scope of the appended claims.

We claim:

1. An ophthalmic lens system for correcting the eikonic defect of a pair of eyes as defined by measured ratios of ocular image sizes in given corresponding meridians of the eyes, said system comprising a pair of contact lens means each having an annular sclerotic portion contacting the eyeball, a vaulted corneal solid lens portion joined to said annular portion, and a fluid lens portion between the cornea and said solid portion, the indices of refraction, surface curvatures and thicknesses of said solid and fluid lens portions of said lens means producing in said meridians image magnification ratios which with said measured ratios provide in said meridians image size ratios of substantial unity.

2. An ophthalmic lens system for correcting the combined dioptric and eikonic defects of a pair of eyes as defined by measured dioptric test corrections and measured ratios of ocular image sizes in given corresponding meridians of the eyes, said system comprising a pair of contact lens means each having an annular sclerotic portion contacting the eyeball, a vaulted corneal solid lens portion joined to said annular portion, and a fluid lens portion between the cornea and said solid portion, the indices of refraction, surface curvatures and thicknesses of said solid and fluid lens portions of said lens means substantially effecting said dioptric test corrections for the respective eyes and producing in said meridians image magnification ratios which with said dioptric correction, and said measured ratios provide in said meridians image size ratios of substantial unity.

3. An ophthalmic lens system for correcting the combined dioptric and eikonic defects of a pair of eyes as defined by measured dioptric test corrections and measured ratios of ocular image sizes in given corresponding meridians of the eyes, said system comprising contact lens means for at least one eye having an annular sclerotic portion contacting the eyeball, a vaulted corneal solid lens portion joined to said annular portion, and a fluid lens portion between the cornea and said solid portion; a spectacle frame; and spectacle lens means having surfaces positioned by said frame at a substantially fixed distance from the respective eyes; the indices of refraction, surface curvatures and thicknesses of said solid and fluid lens portions of said contact lens means and the indices of refraction, surface curvatures, thicknesses and distances from the eyes of said spectacle lens means together substantially effecting said dioptric test corrections for the respective eyes and producing in said meridians image magnification ratios which with said dioptric corrections and said measured ratios provide in said meridians image size ratios of substantial unity.

4. An ophthalmic lens system for correcting the combined dioptric and eikonic defects of a pair of eyes, one of which is aphakic, as defined by measured dioptric test corrections and measured ratios of ocular image sizes in given corresponding meridians of the eyes, said system comprising contact lens means for at least said aphakic eye having an annular sclerotic portion contacting the eyeball, a vaulted corneal solid lens portion joined to said annular portion, and a fluid lens portion between the cornea and said solid portion, the indices of refraction, surface curvatures and thicknesses of said contact lens means defining a collective lens correcting a major part of said aphakia; a spectacle frame; and spectacle lens means having surfaces positioned by said frame at a substantially fixed distance from the respective eyes; the indices of refraction, surface curvatures and thicknesses of said solid and fluid lens portions of said contact lens means and the indices of refraction, surface curvatures, thicknesses and distances from the eyes of said spectacle lens means together substantially effecting said dioptric test corrections for the respective eyes and producing in said meridians image magnification ratios which with said dioptric corrections and said measured ratios provide in said meridians image size ratios of substantial unity.

ADELBERT AMES, Jr.
KENNETH N. OGLE.